(12) United States Patent
He

(10) Patent No.: US 11,036,329 B2
(45) Date of Patent: Jun. 15, 2021

(54) TOUCH SENSING SIGNAL PROCESSING METHOD, SYSTEM AND DEVICE, AND ELECTRONIC DEVICE

(71) Applicants: GUANGZHOU SHIYUAN ELECTRONICS CO., LTD, Guangdong (CN); GUANGZHOU SHIRUI ELECTRONICS CO., LTD., Guangdong (CN)

(72) Inventor: Xin He, Guangdong (CN)

(73) Assignees: GUANGZHOU SHIYUAN ELECTRONICS CO., LTD, Guangdong (CN); GUANGZHOU SHIRUI ELECTRONICS CO., LTD., Guangdong (CN)

( * ) Notice: Subject to any disclaimer, the term of this patent is extended or adjusted under 35 U.S.C. 154(b) by 0 days.

(21) Appl. No.: 16/768,012

(22) PCT Filed: Nov. 6, 2018

(86) PCT No.: PCT/CN2018/114062
§ 371 (c)(1),
(2) Date: May 28, 2020

(87) PCT Pub. No.: WO2019/105188
PCT Pub. Date: Jun. 6, 2019

(65) Prior Publication Data
US 2020/0363898 A1 Nov. 19, 2020

(30) Foreign Application Priority Data
Nov. 29, 2017 (CN) .................. 201711225565.X

(51) Int. Cl.
*G06F 3/041* (2006.01)
*G06F 3/044* (2006.01)
(Continued)

(52) U.S. Cl.
CPC ............ *G06F 3/0416* (2013.01); *G06F 3/044* (2013.01); *G06F 3/045* (2013.01); *G06F 3/046* (2013.01); *G06F 3/0414* (2013.01)

(58) Field of Classification Search
CPC .... G06F 3/0412; G06F 3/0414; G06F 3/0416; G06F 3/042; G06F 3/044; G06F 3/045;
(Continued)

(56) References Cited

U.S. PATENT DOCUMENTS

| | | | |
|---|---|---|---|
| 2014/0062889 A1* | 3/2014 | Kang | G06F 3/04886 345/169 |
| 2014/0267124 A1* | 9/2014 | Christiansson | G06F 3/042 345/173 |
| 2017/0336970 A1 | 11/2017 | Kim et al. | |

FOREIGN PATENT DOCUMENTS

| CN | 102622136 | 8/2012 |
|---|---|---|
| CN | 103488319 | 1/2014 |

(Continued)

OTHER PUBLICATIONS

Office Action dated Chinese Patent Application 201711225565.X dated Sep. 18, 2019.

(Continued)

*Primary Examiner* — Ryan A Lubit
(74) *Attorney, Agent, or Firm* — Honigman LLP

(57) ABSTRACT

The present invention provides a method, a system, and an apparatus for processing a touch sensing signal, and an electronic device. The method is applied to an operating system and includes: receiving a touch sensing signal generated by a touch sensor of a touch device; converting the touch sensing signal to a touch signal, where the touch signal at least comprises a touch position signal; sending the touch signal to the touch device; receiving the touch signal coded by the touch device and transferring to a touch driver. In implementing the embodiments of the present invention, the (Continued)

touch sensing signal generated by the touch sensor is converted to the touch signal by the operating system followed and returned back to the touch device, and therefore the touch device do not need to perform conversion processing, which can reduce the performance requirement on its chip and lower the cost and volume of the touch device.

20 Claims, 5 Drawing Sheets

(51) Int. Cl.
  *G06F 3/045* (2006.01)
  *G06F 3/046* (2006.01)
(58) Field of Classification Search
  CPC ............ G06F 3/046; G06F 2203/0414; H04W 84/18; H04W 4/80
  See application file for complete search history.

(56) References Cited

FOREIGN PATENT DOCUMENTS

| CN | 104238778 | 12/2014 |
| CN | 105045414 | 11/2015 |
| CN | 105335007 | 2/2016 |
| CN | 105912151 | 8/2016 |
| CN | 107272955 | 10/2017 |
| CN | 107861657 | 3/2018 |
| CN | 207473575 | 6/2018 |

OTHER PUBLICATIONS

Office Action mailed in Chinese Patent Application 201711225565.X dated Apr. 19, 2019.
Office Action mailed in Chinese Patent Application 201711225561.1 dated Oct. 23, 2019.
Office Action mailed in Chinese Patent Application 201711225561.1 dated May 7, 2019.
International Search Report and Written Opinion for PCT/CN2018/114062 dated Feb. 13, 2019.
International Search Report and Written Opinion for PCT/CN2018/114056 dated Jan. 1, 2019.
Office Action mailed in Chinese Patent Application 201711225565.X dated Sep. 18, 2019 [English Translation].
Office Action mailed in Chinese Patent Application 201711225565.X dated Apr. 19, 2019 [English Translation].
Office Action mailed in Chinese Patent Application 201711225561.1 dated Oct. 23, 2019 [English Translation].
Office Action mailed in Chinese Patent Application 201711225561.1 dated May 7, 2019 [English Translation].
International Search Report and Written Opinion for PCT/CN2018/114062 dated Feb. 13, 2019 [English Translation].
International Search Report and Written Opinion for PCT/CN2018/114056 dated Jan. 1, 2019 [English Translation].

* cited by examiner

TOUCH SENSING SIGNAL PROCESSING METHOD, SYSTEM AND DEVICE, AND ELECTRONIC DEVICE

CLAIM OF PRIORITY

This application is a 371 application of PCT Application No. PCT/CN2018/114062, filed Nov. 6, 2018, which claims priority to Application No. 201711225565.X, filed Nov. 29, 2017, each of which is incorporated by reference in its entirety.

TECHNICAL FIELD

The present invention relates to the field of touch control technology, and in particular, to a method, a system, and an apparatus for processing a touch signal, and an electronic device.

BACKGROUND

A large number of electronic devices are equipped with various types of touch devices, such as capacitive, resistive, electromagnetic or infrared touch devices. When a user performs a touch operation on a touch screen corresponding to a touch device, a touch sensor of the touch device is able to collect a touch sensing signal, where the touch sensing signal will be different when the type of the touch device is different. For example, when the touch device is electromagnetic, the touch sensing signal collected includes a variation of magnetic flux and a frequency of a received electromagnetic signal; when the touch device is capacitive, the touch sensing signal collected includes a variation of capacitance.

For the touch sensing signal obtained by the touch sensor, a control chip of the touch device converts the touch sensing signal to a touch signal, codes the touch signal according to a data coding specification supported by an operating system and then transfers to the operating system of the electronic device, and then a touch response is made by the operating system.

As touch precision becomes higher, the amount of signal that the control chip needs to process is increasingly large, and the requirement for its signal processing ability are getting higher and higher. In order to enhance the signal processing ability of the control chip, the touch device needs to adopt a high-performance chip. However, the high-performance chip has a high cost and a large volume, which will cause the cost and volume of the touch devices to increase.

SUMMARY

In view of this, embodiments of the present invention provide a method, a system, and an apparatus for processing a touch sensing signal, and an electronic device, so as to solve the problem of the high cost and large volume of the control chip raised by the high-performance chip.

In the first aspect, embodiments of the present disclosure provide a system for processing a touch sensing signal, comprising a touch device and a host device, the touch device comprises a touch sensor, the host device is equipped with an operating system, the operating system comprises signal processing code and a touch driver;

the touch sensor generates a touch sensing signal, the touch device sends the touch sensing signal to the operating system;

the signal processing code converts the touch sensing signal received by the operating system to a touch signal and sends the touch signal to the touch device, the touch signal at least comprises a touch position signal;

the touch device codes the touch signal according to a standard data coding specification, and sends the coded touch signal to the operating system;

the touch driver analyzes the coded touch signal, and transfers it to the input subsystem.

In an alternative embodiment, the touch sensor comprises one or more of following:

an infrared touch frame, an electromagnetic panel, a capacitive touch panel, a resistive touch panel, or a pressure sensor.

In an alternative embodiment, when the touch sensor is the electromagnetic panel, the touch sensing signal comprises a variation of magnetic flux and a frequency of a received electromagnetic signal, and the touch signal comprises a touch position signal corresponding to the variation of magnetic flux and a pressure sensitive signal corresponding to the frequency.

In an alternative embodiment, the touch device sends the touch sensing signal to the operating system via any one of following interfaces:

a USB-bulk interface, a USB-hid interface, an RS232 interface.

In an alternative embodiment, the touch device sends the coded touch signal to the operating system via the USB-hid interface.

In an alternative embodiment, the system also includes a virtual touch device and an input subsystem the virtual touch device is connected with the signal processing code and the input subsystem, the signal processing code converts the touch sensing signal received by the operating system to a touch signal and sends the touch signal to the touch device, or sends the touch signal to the virtual touch device;

the virtual touch device codes the received touch signal according to a data coding specification supported by the input subsystem and sends to the input subsystem;

the input subsystem responds to the touch signal coded by the virtual touch device and generates a corresponding touch event.

In another aspect, the present embodiment also provides a method for processing a touch sensing signal, applied to an operating system, the method comprising the steps of:

receiving a touch sensing signal generated by a touch sensor of a touch device;

converting the touch sensing signal to a touch signal, the touch signal at least comprises a touch position signal;

sending the touch signal to the touch device so that the touch device codes the touch signal according to a standard data coding specification;

receiving the touch signal coded by the touch device, and transferring to a touch driver so that the touch driver analyzes the coded touch signal.

In an alternative embodiment, before sending the touch signal to the touch device, the method further comprises:

sending the touch signal to a virtual touch device if the virtual touch device is detected, so that the virtual touch device codes the touch signal according to the data coding specification supported by the input subsystem and sends the touch signal to the input subsystem, the input subsystem is configured to generate a corresponding touch event in response to the touch signal coded by the virtual touch device;

the step of sending the touch signal to the touch device is executed when the virtual touch device is not detected.

In another aspect, the present embodiment also provides an apparatus for processing a touch signal, applied to an operating system, and comprising:

a touch sensing signal receiving module, configured to receive a touch sensing signal generated by a touch sensor of a touch device;

a touch sensing signal converting module, configured to convert the touch sensing signal to a touch signal, the touch signal at least comprises a touch position signal;

a touch signal returning module, configured to send the touch signal to the touch device so that the touch device codes the touch signal according to a standard data coding specification;

a touch signal transferring module, configured to receive the touch signal coded by the touch device and send to a touch driver, so that the touch driver analyzes the received touch signal.

In an alternative embodiment, the present embodiment also provides an electronic device, the electronic device is equipped with a touch device, a processor and a memory which is configured to store instructions executable by the processor; the touch device comprises a touch sensor; wherein, the processor is coupled to the memory and configured to read the instructions stored in the memory, and in response, execute operations of the method.

In an alternative embodiment, the electronic device comprises a smart writing board.

In an alternative embodiment, the smart writing board comprises an electronic white board.

In another aspect, the present embodiment also provides a medium readable by one or more machines, the medium has instructions stored thereon, which when executed by one or more processors cause the one or more processors to execute operations of the method.

In an alternative embodiment, the processor is further configured to execute the following operations:

when a virtual touch device is detected, sending the touch signal to the virtual touch device so that the virtual touch device codes the touch signal according to a data coding specification supported by an input subsystem and send to the input subsystem; the input subsystem is configured to generate a corresponding touch event in response to the touch signal coded by the virtual touch device;

when the virtual touch device is not detected, sending the touch signal to the touch device.

In an alternative embodiment, the electronic device includes a smart writing board.

In an alternative embodiment, the smart writing board includes an electronic white board.

Implementing the embodiments provided by the present invention, a touch sensor of a touch device generates a touch sensing signal and then transfers the touch sensing signal to an operating system, the operating system converts the touch sensing signal to a touch signal and returns back to the touch device, and then the touch device codes the touch signal according to a standard data coding specification and then returns it to the operating system. Consequently, the touch device does not need to perform conversion processing from the touch sensing signal to the touch signal, which can reduce the performance requirement on the control chip, then enable the touch device to adopt a low performance chip as the control chip, and thus lower the cost and the volume of the touch device.

DESCRIPTION OF EMBODIMENTS

Exemplary embodiments will be described in detail here, the illustrations of which are shown in accompanying drawings. When the accompanying drawings are involved in the following description, a same numeral in different drawings represents a same or similar element unless specified otherwise. Implementations described in the following exemplary embodiments do not represent all embodiments in conformity with the present invention. Rather, they are merely examples of the apparatus and method which are described in detail in the appended claims and in conformity with some aspects of the present invention.

Terminology used in the present invention is only for the purpose of describing specific examples rather than limiting the present invention. The singular form of "a", "the" and "said" used in the present invention and appended claims are also intended to include the plural form, unless other meaning is clearly specified in the context. In addition, it could be understood that the term of "and/or" used herein refers to any or all possible combinations of one or more listed relevant items.

It could be understood that although in the present invention the terms of "first", "second", "third" may be used to describe various information, the information should not be limited by these terms. Instead, they are only used to distinguish the information of the same type from each other. For example, without deviating from the scope of the present invention, the first information may be referred to as the second information, and likewise, the second information may be referred to as the first information as well. Depending on context, the word "if" as used herein may be explained as "as" or "when" or "in response to determination".

Figure 1:
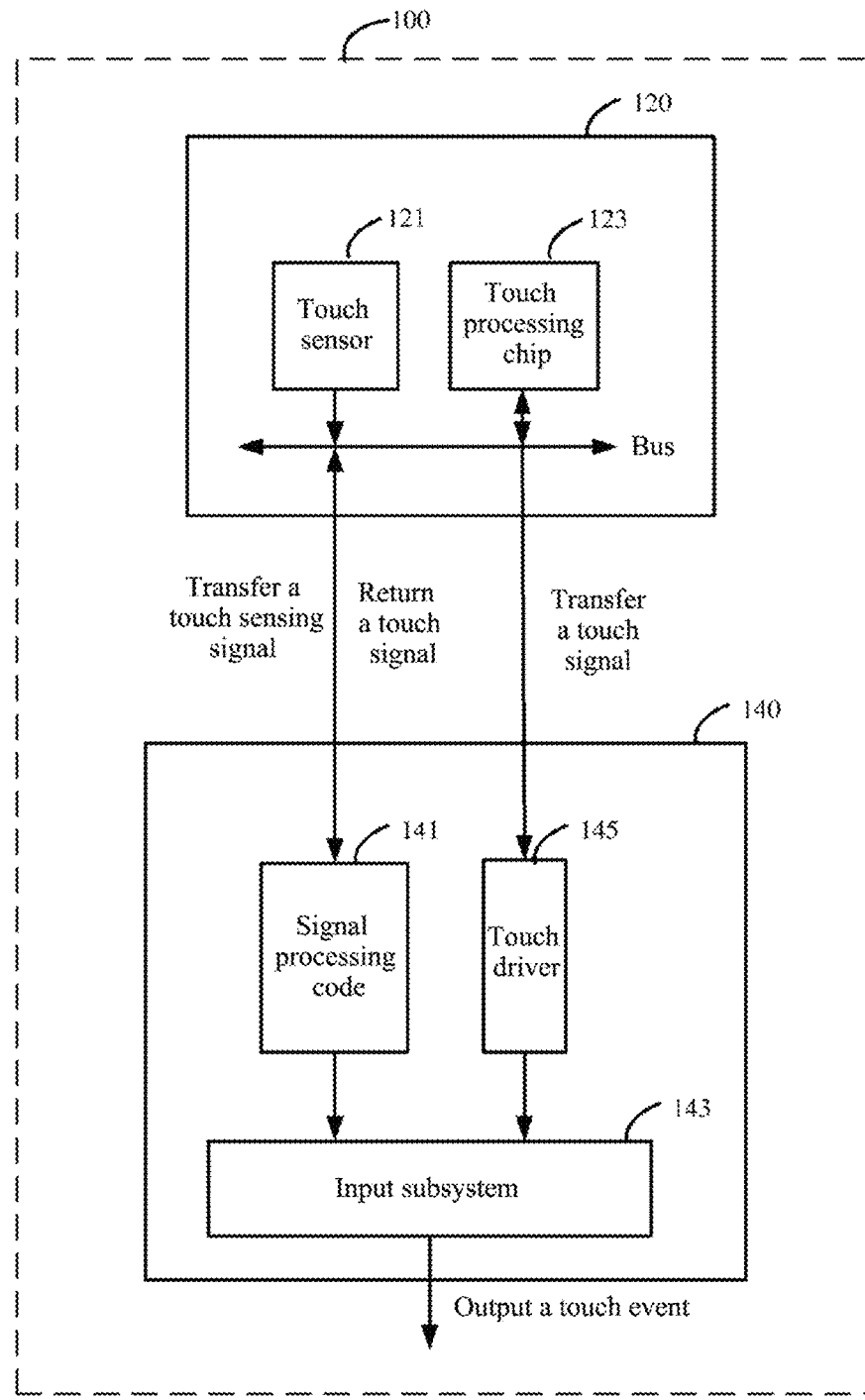
FIG. 1 is an architecture diagram of a system for processing a touch sensing signal according to an exemplary embodiment of the present invention.

Referring to FIG. 1, FIG. 1 is an architecture diagram of a system 100 for processing a touch sensing signal described in an exemplary embodiment of the present invention. The system 100 for processing may include a touch device 120 and a host device 140, the touch device 120 may include a touch sensor 121, the host device 140 may be equipped with an operating system (not shown in FIG. 1), and the operating system may include signal process code 141 and a touch drive 145.

The host device 140 may refer to a host of an electronic device or a part capable of realizing a touch response in the host. The touch device 120 may refer to a touch input device independent of the electronic device or a touch input device installed on the electronic device. Here, the electronic device may be a laptop, a cell phone, a camera phone, a smart phone, a personal digital assistant, a media player, a navigation device, a smart writing device, an email sending and receiving device, a game console, a tablet computer, a wearable device, a smart vehicle, a driverless car, a smart refrigerator, or other smart home devices or any combination of these devices. The smart writing device may be an electronic white board, an electronic black board and so on.

A type of touch screen corresponding to the touch device 120 may be electromagnetic, infrared, capacitive, resistive, pressure sensitive and so on, and for example, the type of touch screen of a smart phone is capacitive or resistive, the type of touch screen of a smart writing board is electromagnetic, the type of touch screen of an infrared display is infrared.

When the type of touch screen corresponding to the touch device 120 is different, the type of the touch sensor 121 is different, the touch sensing signal it collects is different and the converted touch signal is not identical either. Some examples of the touch sensor 121 are illustrated for various types of touch screens in the following.

Type 1: the touch screen is infrared, and the touch sensor 121 is an infrared touch frame, the touch sensing signal it collects may include a signal indicating that an infrared ray is interrupted, and the converted touch signal may include a touch position signal which may include X and Y coordinates of a touch position.

Type 2: the touch screen is an electromagnetic touch screen, and the touch sensor 121 is an electromagnetic panel, the touch sensing signal it collects may include a variation of magnetic flux and a frequency of a received electromagnetic signal, the converted touch signal may include a touch position signal corresponding to the variation of magnetic flux and a pressure sensitive signal corresponding to the frequency. The touch position signal may include X and Y coordinates of a touch position. The pressure sensitive signal may include a pressure value.

Type 3: the touch screen is a capacitive touch screen, and the touch sensor 121 is a capacitive touch panel, the touch sensing signal it collects may include currents flowing through respective electrodes of the touch screen, the converted touch signal may include a touch position signal which may include X and Y coordinates of a touch position.

Type 4: the touch screen is a resistive touch screen, and the touch sensor 121 is a resistive touch panel, the touch sensing signal it collects may include a voltage at a touch position, the converted touch signal may include a touch position signal which may include X and Y coordinates of the touch position.

Type 5: the touch screen is a pressure-sensitive touch screen, and the touch sensor 121 is a pressure sensor, the touch sensing signal it collects may include a pressure signal, the converted touch signal may include a touch position signal, and the touch position signal may include X and Y coordinates of a touch position.

In other examples, the touch screen of the touch device 120 may include at least two types of touch screens of an electromagnetic touch screen, an infrared touch screen, a capacitive touch screen, a resistive touch screen, a pressure-sensitive touch screen, and correspondingly, the touch sensor 121 may include at least two of an infrared touch frame, an electromagnetic panel, a capacitive touch panel, a resistive panel and a pressure sensor. Or, the touch device 120 may be other types of touch screens as well, which is not limited in the embodiments of the description.

After the touch sensor 121 collects the touch sensing signal, when the touch device 120 transfers the touch sensing signal to the operating system, if the touch sensor 121 is a device with functions of control and collecting, such as a touch sensor chip, the touch sensing signal may be transferred by the touch sensor 121 to the operating system directly through a predetermined interface. Here, the mentioned predetermined interface may be a USB-bulk interface, an RS232 interface or a USB-hid interface (hid is an abbreviation of Human Interface Devices) and so on. The USB-hid interface may be a versatile USB-hid interface. Further, the predetermined interfaces may also be a signal transfer interface customized by a designer of the solution according to the present invention or other equipment producers.

In other examples, the touch device 120 may also include a touch processing chip 123. When the touch device 120 transfers the touch sensing signal to operating system, if the touch sensor 121 dose not possess a function of control, the touch sensing signal may be read from the touch sensor 121 by the touch processing chip 123, and then the touch sensing signal is transferred to the operating system by the touch processing chip 123 via the predetermined interface. Here, the touch processing chip 123 mentioned may be a main control chip (also referred to as a main processing chip or a central processing unit) of the touch device, or may be other processing chips additionally configured for the touch device 120, which may be provided in the touch device 120, or outside the touch device 120.

In the operating system, it is the signal processing code 141 that receives the touch sensing signal. The signal processing code 141 is a module in a logical sense and is configured to convert the received touch sensing signal to the touch signal and then return it back to the touch device 120.

When converting the touch sensing signal, as a module in a logical sense, the signal processing code 141 may be generated by means of reading corresponding computer program instructions in a readable medium, such as a non-volatile storage, into a memory by a central processing unit (which also may be referred to as a main control chip or a main processing processor) of the host device 140 or by other processing chips than the central processing unit, and then running. The processor of the host device 140 or other chips than the processor may read program instructions stored in the storage thereof and convert the touch sensing signal to the touch signal in response.

In practice, when the touch sensing signal is converted to the touch signal, different conversion methods may be adopted corresponding to different types of touch screens based on their respective operating modes. For example, the touch sensing signal is currents flowing through respective electrodes of a capacitive touch screen generated by the touch screen, and X and Y coordinates of a touch position may be determined according to the proportion of the currents of the respective electrodes.

After the conversion from the touch sensing signal to the touch signal, in order that the operating system recognize and respond to the touch signal subsequently, the signal processing code 141 may transfer the touch signal to the touch device 120. Here, the touch signal may also be transferred via the above-mentioned predetermined interface when being transferred.

In order to realize a touch response, touch device 120 may include a memory and a non-volatile storage. The storage may store code used for coding the touch signal. The code includes executable program instructions. After the touch device 120 receives the touch signal, the touch processing chip 123 of the touch device 120 may read the executable program instructions from the non-volatile storage to the memory to run, to generate a module in a logical sense. This module may be referred to as signal coding code. As a response, the signal coding code may code the received touch signal according to a standard data coding specification and then transfer it to the operating system. The touch signal coded by the touch device 120 is then analyzed by the touch drive 145 of the operating system. In practical applications, a different type of the touch device 120 may correspond to a different type of the standard data coding specification. In some examples, the standard data coding specification mentioned herein may be a standard USB multitouch hid protocol corresponding to the USB-hid interface, and accordingly, the touch diver 145 may be a multi-touch driver (hid-multitouch driver).

In some scenarios, the system 100 for processing may be applied to an electronic device. The touch device 120 may include a touch screen, and the touch sensor 121 may be installed on the touch screen, or may be independent of the touch screen. The system 100 for processing may also include an interface (which is not shown in FIG. 1 and may be the above-mentioned predetermined interface) provided between the touch device 120 and the operating system. The operating system may include an input subsystem (input_device) 143 as well. When a user touches the touch screen by a finger or a stylus, the touch sensor 121 may generate a touch sensing signal which is sent by the touch device 120 to the operating system. The signal processing code 141 in the operating system may convert the received touch sensing signal to the touch signal and return it back to the touch device 120. Further, the touch processing chip 123 of the touch device 120 may code the touch signal according to a standard data coding specification and transfer the coded touch signal to the operating system. The touch driver 145 of the operating system analyzes the coded touch signal, and the analyzed touch signal may be transferred to the input subsystem 143. The input subsystem 143 recognizes the analyzed touch signal directly to generate a touch event.

The input subsystem 143 may consist of a device driver tier, a core input tier and an event processing tier. The device driver tier may convert a hardware input on a bottom tier to a unified event form and report to the core input tier. The core input tier may act as a connecting link between tiers, which may register with an operation interface for an input event on the device driver tier, and notify the event processing tier of handling the event.

When the touch device 120 sends the touch sensing signal to the operating system, the touch sensing signal may be transferred via the above predetermined interface according to various demands. For example, if a high communication speed is required, the touch sensing signal may be transferred via a USB-bulk interface; if a high communication speed as well as high communication stability is required, the touch sensing signal may be transferred via a USB-hid interface; if a concise communication process is required, the touch sensing signal may be transferred via an RS232 interface. Here, before the transfer of the touch sensing signal via a corresponding interface, it may be converted to a protocol supported by the corresponding interface, and then transferred via the corresponding interface. Likewise, when transferring the touch signal via the corresponding interface to the touch device 120, the operating system may also convert the touch signal to the protocol supported by the corresponding interface, and then transfer via the corresponding interface. In other examples, on other demands, other types of interfaces may be adopted to transfer the touch sensing signal or return the touch signal, which is not limited in the present invention.

In some scenarios, after the signal processing code of the operating system converts the touch sensing signal to the touch signal, the touch signal may not be returned back to the touch device in an embodiment of the present invention. Instead, the touch signal may be transferred to the input subsystem (input_device) in other manners to respond, and reference can be made to the architecture diagram of a system 200 for processing a touch sensing signal shown in FIG. 2 for the details. The system 200 for processing may include a touch device 220 and a host device 240, the touch device 220 may include a touch sensor 221, the host device 240 is equipped with an operating system, and the operating system may include signal processing code 241, a virtual touch device 242, an input subsystem 243 and a touch driver 245.

The touch device 220, the touch sensor 221, the signal processing code 241, the touch driver 245 and the input subsystem 243 in the present embodiment correspond to the technical contents in the embodiments related to FIG. 1. When implementing all or parts of the following operations, corresponding technical contents in the embodiments related to FIG. 1 are also involved, which are not repeated herein.

The touch device 221 generates a touch sensing signal, and the touch device 220 sends the touch sensing signal to the operating system.

The signal processing code 241 converts the touch sensing signal received by the operating system to a touch signal and sends the touch signal to the touch device 220.

The touch device 220 codes the touch signal according to a standard data coding specification, and sends the coded touch signal to the operating system.

The touch driver 245 analyzes the coded touch signal, and transfers it to the input subsystem 243.

The input subsystem 243 directly recognizes the analyzed touch signal, and generates a corresponding touch event.

The difference lies in: after the signal processing code 241 converts the touch sensing signal received by the operating system to the touch signal, the touch signal may not be sent to the touch device 220, but rather to the virtual touch device 242; the virtual touch device 242 codes the received touch signal according to a data coding specification supported by the input subsystem 243 and sends to the input subsystem 243, and the input subsystem 243 responds to the touch signal coded by the virtual touch device and generates a corresponding touch event.

With regard to the virtual touch device 242, it is a virtual device which is simulated with software, functions as the touch device 20 and operates in the operating system. In the beginning of operation, a data coding specification of a signal which is later transferred to the input subsystem 243, that is, a data coding specification supported by the input subsystem 243, may be predetermined for the input subsystem 243. The data coding specification may be an effective data coding specification extracted from a standard data coding specification, or may be a predetermined data coding specification. In practical applications, when the type of the touch device 220 is different, the type of the virtual touch device 240 may be different, and the data coding specification supported by the input subsystem 243 may also be different. For example, when the touch device 220 is an infrared touch frame device, the virtual touch device 240 is a virtual touch frame device.

In some examples, the data coding specification supported by the input subsystem 243 may be an effective touch data protocol extracted from a USB multitouch hid protocol corresponding to a USB-hid interface. Here, the word "extract" is used to emphasize that: the standard USB multitouch hid protocol will add some header and message required by a USB transfer protocol to the effective touch data protocol, for USB protocol transfer, whilst the added data is not needed by the input subsystem. Further, the data coding specification supported by the input subsystem 243 also may be a data coding specification predetermined by a designer of the solution according to an applicational requirement of the touch device 220, which is not limited in the embodiments of the description.

In some scenarios, the system 200 for processing may be applied to an electronic device, the touch device 220 may include a touch screen, the touch sensor 221 may be installed on the touch screen, or may be independent of the touch screen. The system 200 for processing may also include an interface (the above predetermined interface) provided between the touch device 220 and the operating system. When a user touches the touch screen by a finger or a stylus, the touch sensor 221 may generate a touch sensing signal and the touch device 220 sends the touch sensing signal to the operating system. The signal processing code 241 in the operating system may convert the received touch sensing signal to the touch signal and send the touch signal to the virtual touch device 242. Further, the virtual touch device 242 codes the touch signal according to the data coding specification supported by the input subsystem 243, and sends the coded touch signal to the input subsystem 243 which, in turn, generates a corresponding touch event in response to the coded touch signal.

After the signal processing code 241 converts the touch sensing signal to the touch signal and transfers to the virtual touch device 242, the data coding specification that the virtual touch device 242 adopts when coding the touch signal may be related to the type of the touch screen corresponding to the touch device 220.

For instance, when the touch screen is an electromagnetic touch screen, the data coding specification adopted may be a USB protocol which supports input of a signal electromagnetic pen, and the touch signal is coded as a touch signal triggered by a signal electromagnetic pen, then the coded touch signal is mapped to a packet body of the USB protocol.

In practical applications, the touch signal may be mapped to the packet body of the USB protocol according to the format in table 1 (corresponding to descriptors of hid pen)

TABLE 1

| Byte number | Function |
| --- | --- |
| 0 | Message ID (0x10) |
| 1 | Function key (5 bits for Tip/Barrel/Eraser/Invert/In Range, the other 3 bits are reserved) |
| 2 | Low byte data of X coordinate of the point |

TABLE 1-continued

| Byte number | Function |
| --- | --- |
| 3 | High byte data of X coordinate of the point |
| 4 | Low byte data of Y coordinate of the point |
| 5 | High byte data of Y coordinate of the point |
| 6 | Low byte data of pressure of the point |
| 7 | High byte data of pressure of the point |

For another instance, if the touch screen is a capacitive touch screen, the data coding specification adopted may be a multitouch protocol. In coding, the touch signal is coded to be data satisfying a format specified by the multitouch protocol and the coded touch signal is then packed into the packet body of the same packet.

In practical applications, the touch signal may be mapped to the packet body of the multitouch protocol according to the format in table 2 (corresponding to descriptors of hid multitouch):

TABLE 2

| Byte number | Function |
| --- | --- |
| 0 | Message ID (0x03) |
| 1 | State of the first point (0x03: press down; 0x02: lift up; 0x00: no touch) |
| 2 | ID of the first point (0x00) |
| 3 | Low byte data of X coordinate of the first point |
| 4 | High byte data of X coordinate of the first point |
| 5 | Low byte data of Y coordinate of the first point |
| 6 | High byte data of Y coordinate of the first point |
| 7 | Low byte data of pressure of the first point |
| 8 | High byte data of pressure of the first point |
| 9~16 | Data of the second point |
| 17 | Number of effective points |

As shown in table 2, data of the first touch point includes information of state, ID, X, Y and Pressure, corresponding to byte numbers 1 to 8; data of the second touch point includes information of state, ID, X, Y and Pressure, corresponding to byte numbers 9 to 16; byte number 17 indicates the number of touch points (the number of pens) included in the data packet.

In some examples, the resolution of touch screen is 32767*32767, the origin of coordinates is the top left corner of the touch screen, the touch signal may include data of more points, such as position coordinates of six or more pixel points. In this case, the virtual touch device 242 may code the touch signal by group according to the data coding specification, and each group of touch signals is coded to generate one data packet which includes position coordinates of up to six pixel points.

In practical applications, coding is carried out by group. In coding for each group, the touch signal may be mapped to the packet body of a data packet according to the format in table 3:

TABLE 3

| Byte | Content | Specification |
| --- | --- | --- |
| 10*n + 1 | State of the nth point | The value of n is [0:5] 0x02: press down at the touch point 0x03: move from the touch point 0x02: lift up from the touch point 0x00: ineffective touch point |
| 10*n + 2 | id of the nth point | id is [0:5] |
| 10*n + 3 | Low byte of X coordinate of the nth point | Value range is 0~32767 On the left edge, |
| 10*n + 4 | High byte of X coordinate of the nth point | x coordinate approaches to 0 On the right edge, |

TABLE 3-continued

| Byte | Content | Specification |
| --- | --- | --- |
| 10*n + 5 | Low byte of Y coordinate of the nth point | x coordinate approaches to 32767 Value range is 0~32767 On the top edge, |
| 10*n + 6 | High byte of Y coordinate of the nth point | y coordinate approaches to 0 On the bottom edge, y coordinate approaches to 32767 |
| 10*n + 7 | Low byte of width of the nth point | Value range is 0~32767 |
| 10*n + 8 | High byte of width of the nth point | |
| 10*n + 9 | Low byte of height of the nth point | Value range is 0~32767 |
| 10*n + 10 | High byte of height of the nth point | |
| 61 | Number of effective points | Including the effective points of other data packet for this touch |

Data of up to 6 touch points is included in each data packet. The data packets are sent separately. The first data packet sent may include the number of effective touch points triggered by the present touch. The other data packets carry 0x00 at corresponding places. The input subsystem 243 may distinguish various points by IDs of the touch points.

After the input subsystem 243 receives the coded touch signal, a corresponding protocol may be adopted to analyze the touch signal to obtain the analyzed touch signal, which is then converted to a corresponding touch event.

In the following, the touch signal processing procedure applied to the operating system will be introduced with reference to the accompanying drawings.

Figure 3:
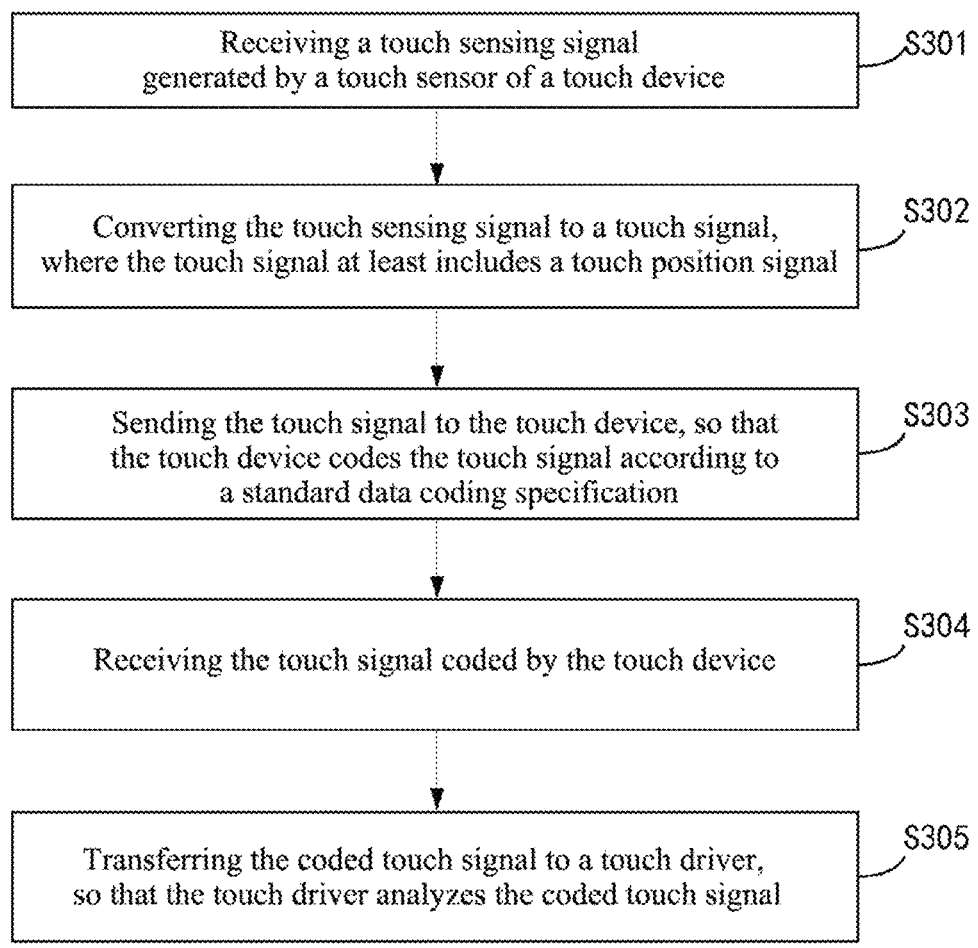
FIG. 3 is a flowchart of a method for processing a touch sensing signal according to an exemplary embodiment of the present invention.

Referring to FIG. 3, FIG. 3 is a flow chart for a processing method of a touch sensing signal described in an exemplary embodiment of the present invention. The embodiment is applied to an operating system and may include steps S301 to S305 as below.

Step S301: receiving a touch sensing signal generated by a touch sensor of a touch device.

Step S302: converting the touch sensing signal to a touch signal, where the touch signal at least includes a touch position signal.

Step S303: sending the touch signal to the touch device so that the touch device codes the touch signal according to a standard data coding specification.

Step S304: receiving the touch signal coded by the touch device.

Step S305: transferring the coded touch signal to a touch driver so that the touch driver analyzes the coded touch signal.

Technical features involved in the present embodiment are corresponding to those involved in the embodiment corresponding to FIG. 1, which will not be repeated herein.

Figure 2:
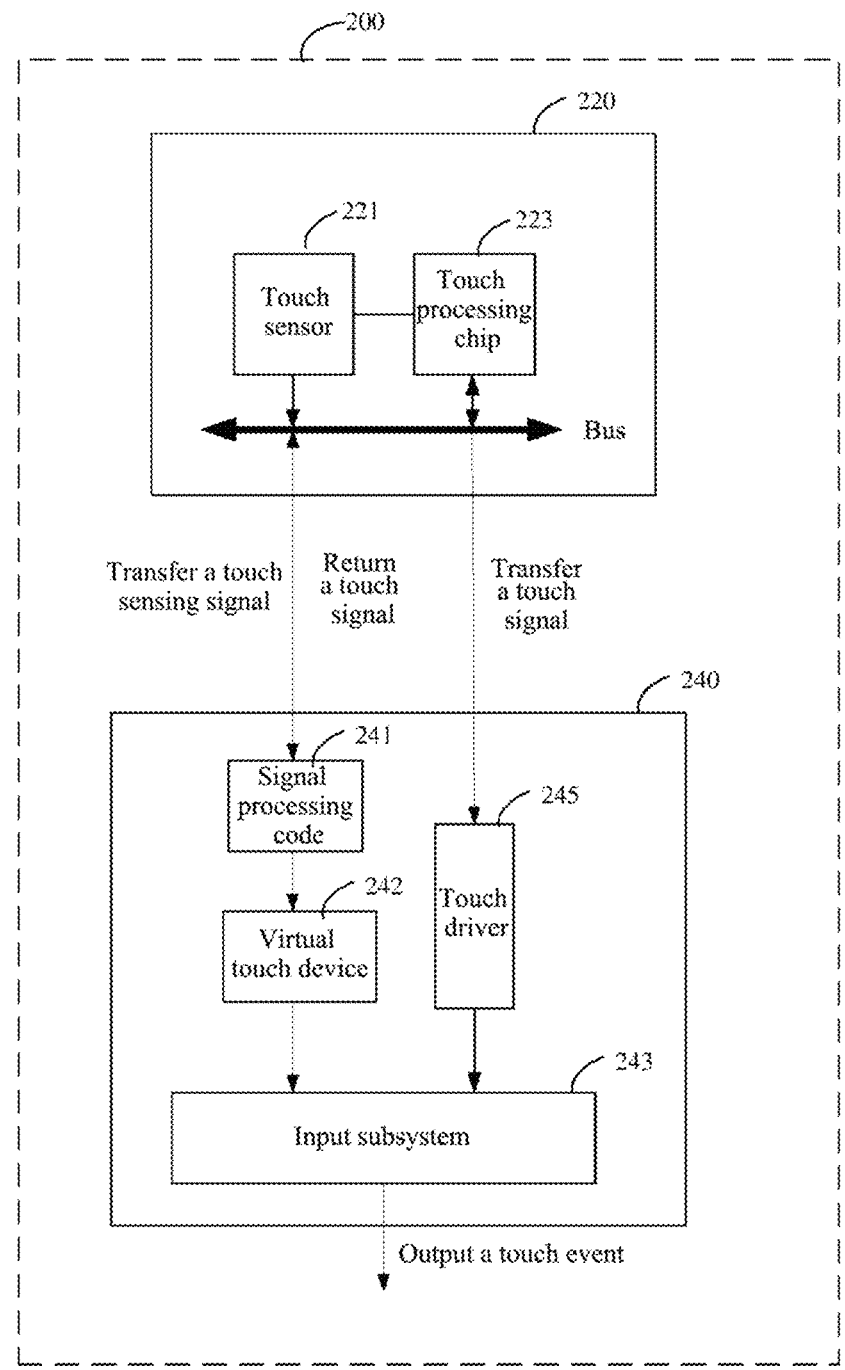
FIG. 2 is an architecture diagram of a system for processing a touch sensing signal according to another exemplary embodiment of the present invention.

The embodiments of the present invention may be applied to the operating system shown in FIG. 1 or FIG. 2. The operating system may be an operating system of various electronic devices having a touch screen, such as a display, a learning machine, a smart writing board, etc. The smart writing board may be an electronic black board, an electronic white board, etc. In these devices a variety of applications required by users are installed, such as a text editing application, an image editing application, a social networking application, an e-commerce application, a searching application, an internet browsing application, etc. The text editing application may be, for example, an application applied to a white board. The input subsystem of the operating system generates the corresponding touch event according to the received touch signal, and then upload to a corresponding application to assist the application to make a response to the event.

For example, in the case that the application is the one of a white board application, the touch event corresponding to the touch signal triggered by the electromagnetic pen is an event of adding written contents. The operating system may assist the application to control to display the written contents triggered by the electromagnetic pen.

In other embodiments, before sending the touch signal to the touch device, the method for processing a touch sensing signal according to the present invention may also send the touch signal to a virtual touch device if the virtual touch device is detected, so that the virtual touch device codes the touch signal according to the data coding specification supported by the input subsystem and sends the touch signal to the input subsystem. The input subsystem is configured to generate a corresponding touch event in response to the touch signal coded by the virtual touch device. Reference can be made to the technical contents in the embodiment related to FIG. 2 for the details, which will not be repeated herein.

The step of sending the touch signal to the touch device is executed when the virtual touch device is not detected. Reference can be made to the technical contents in the embodiment related to FIG. 1 for the details, which will not be repeated herein.

Figure 4:
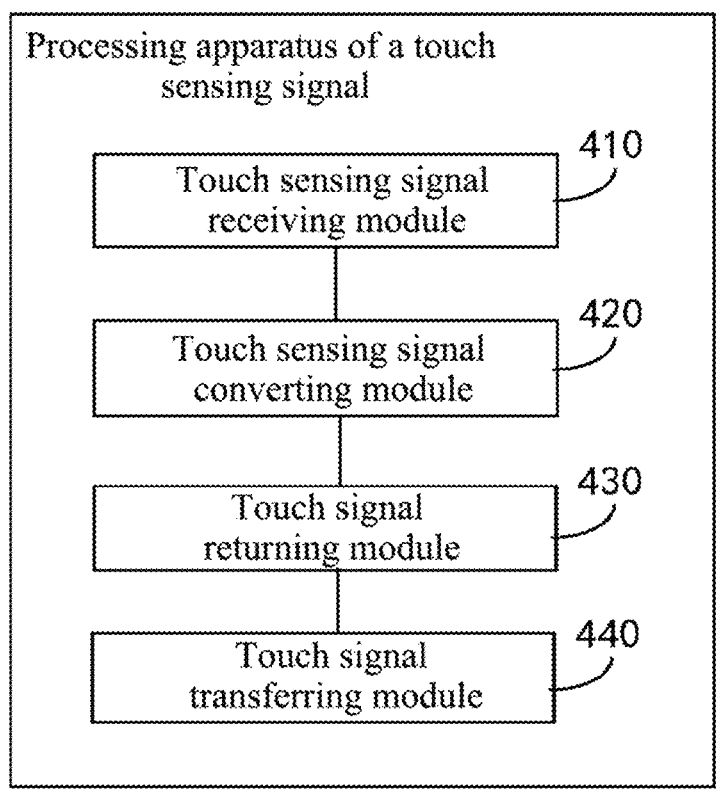
FIG. 4 is a block diagram of an apparatus for processing a touch signal according to an exemplary embodiment of the present invention.

Referring to FIG. 4, FIG. 4 is a block diagram of an apparatus for processing a touch signal described in an exemplary embodiment of the present invention. The apparatus may be applied to an operating system, and include: a touch sensing signal receiving module 410, a touch sensing signal converting module 420, a touch signal returning module 430 and a touch signal transferring module 440.

The touch sensing signal receiving module 410 is configured to receive a touch sensing signal generated by a touch sensor of a touch device.

The touch sensing signal converting module 420 is configured to convert the touch sensing signal to a touch signal, where the touch signal at least includes a touch position signal.

The touch signal returning module 430 is configured to send the touch signal to the touch device so that the touch device codes the touch signal according to a standard data coding specification.

The touch signal transferring module 440 is configured to receive the touch signal coded by the touch device and send to a touch driver, so that the touch diver analyzes the touch signal that is received by the touch diver.

In some examples, the touch sensor includes one or more of the following:

an infrared touch frame, an electromagnetic panel, a capacitive panel, a resistive panel and a pressure sensor.

In some examples, when the touch sensor is the electromagnetic panel, the touch sensing signal includes a variation of magnetic flux and a frequency of a received electromagnetic signal, and the touch signal includes a touch position signal corresponding to the variation of magnetic flux and a pressure signal corresponding to the frequency.

In some examples, the touch device sends the touch sensing signal to the operating system via any of the following interfaces:

a USB-bulk interface, a USB-hid interface, an RS232 interface.

In some examples, the touch device sends the coded touch signal to the operating system via the USB-hid interface.

In some examples, the apparatus for processing a touch signal according to an exemplary embodiment of the present invention includes:

a first transferring submodule, configured to send the touch signal to a virtual touch device when the virtual touch device is detected, so that the virtual touch device codes the touch signal according to a data coding specification supported by the input subsystem and sends to the input subsystem; the input subsystem is configured to generate a corresponding touch event in response to the touch signal coded by the virtual touch device;

a second transferring submodule, configured to send the touch signal to the touch device when the virtual touch device is not detected.

For the details of the process of implementing the functions and effects of the units (or modules) of the above apparatus, reference can be made to the process of implementing corresponding steps in the above method, which will not be repeated herein.

As for the apparatus embodiments, because they basically correspond to the method embodiments, reference can be made to the part of description of the method embodiments for relevant parts. The apparatus embodiments described above are only illustrative, where the units or modules described as separate parts may be or may not be separated physically, the components displayed as units or modules may be or may not be physical units or modules, that is, may be in one place, or distributed among a number of network units or modules. Part or all of the modules could be selected according to practical requirements, to realize the objective of the present invention. Those of ordinary skill in the art could understand and implement them without making any creative effort.

The embodiments of the apparatus for processing a touch signal may be applied to an electronic device, and may be specifically implemented by a computer chip or entity, or a product with a certain function. In a typical implementation, the specific form of the electronic device may be those with an electromagnetic screen, such as a personal computer, a laptop, a cellphone, a camera phone, a smart phone, a personal digital assistant, a media player, a navigation device, a smart writing device, an email sending and receiving device, a game console, a tablet computer, a wearable device, an Internet television, a smart vehicle, a driverless car, a smart refrigerator, other smart home devices or any combination of these devices. The smart writing device may be an electronic white board, an electronic black board and so on.

Figure 5:
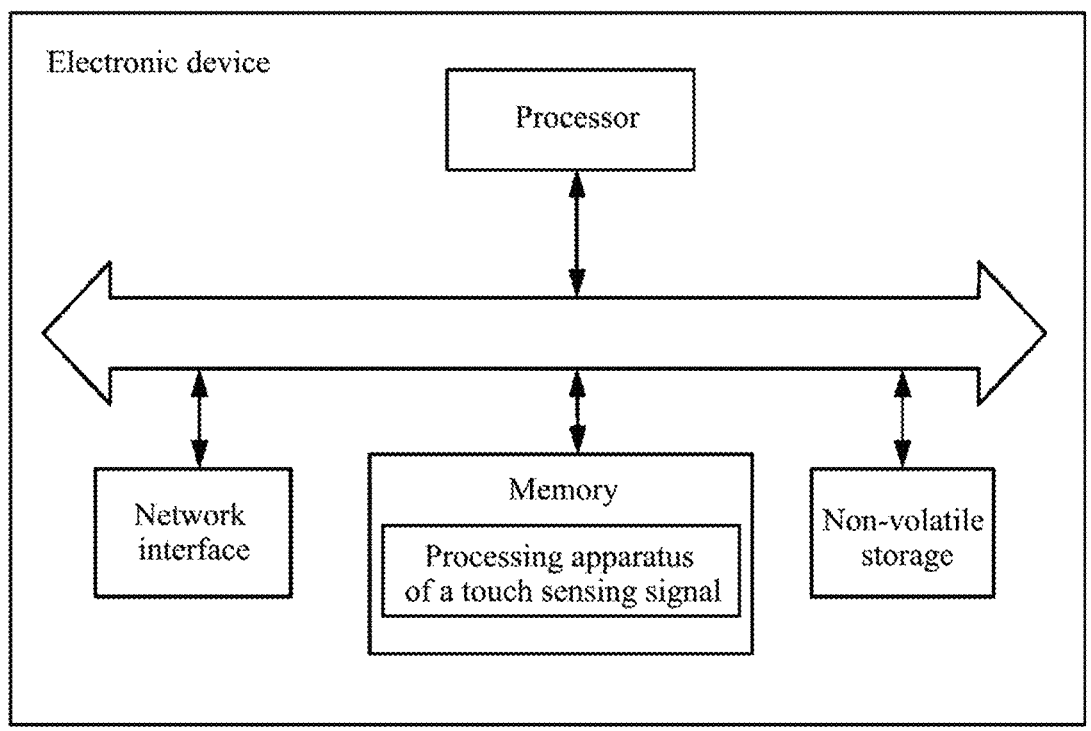
FIG. 5 is a hardware structural diagram of an electronic device according to an exemplary embodiment of the present invention.

The apparatus embodiments may be implemented with software, or the combination of hardware and software. Taking software as an example, as an apparatus in a logical sense, it is generated by means of reading corresponding computer program instructions in a readable medium, such as a non-volatile storage, into a memory by a processor of the electronic device where the apparatus is located, and running. In the sense of hardware, as is shown in FIG. 5, which is a hardware structural diagram of an electronic device where the apparatus for processing a touch signal according to the present invention is located. Besides the processor, memory, network interface and non-volatile storage shown in FIG. 5, the electronic device where the apparatus is located usually may be equipped with a touch device according to a real function of the electronic device, and the equipped touch devices may be installed on or independent of the electronic device. The touch device may include a touch sensor, for example, being equipped with an electromagnetic touch screen which includes an electromagnetic sensor, or may include other hardware, which is not detailed herein. The storage of the electronic device may store program instructions executable by the processor. The processor may be coupled with the memory and configured to read the program instructions stored in the storage, and in response, execute the following operations: receiving a touch sensing signal generated by the touch sensor; converting the touch sensing signal to a touch signal, where the touch signal at least includes a touch position signal; sending the touch signal to the touch device so that the touch device codes the touch signal according to a standard data coding specification; receiving the touch signal coded by the touch device, and transferring to a touch driver so that the touch driver analyzes the coded touch signal.

In some examples, the processor is further configured to execute the following operations:

when a virtual touch device is detected, sending the touch signal to the virtual touch device so that the virtual touch device codes the touch signal according to a data coding specification supported by an input subsystem and send to the input subsystem; the input subsystem is configured to generate a corresponding touch event in response to the touch signal coded by the virtual touch device;

when the virtual touch device is not detected, sending the touch signal to the touch device.

In some other examples, the electronic device includes a smart writing board.

As an example, the smart writing board includes an electronic white board.

In other examples, reference can be made to relevant description of the above method embodiments for the operations executed by the processor, which are not repeated herein.

In addition, the embodiments of the present invention also provide a machine-readable storage medium (storage of an electronic device). In the readable storage medium, program instructions are stored. The program instructions include instructions corresponding to the steps of the method for processing a touch sensing signal described above, which when executed by one or more processors cause the one or more processors to execute the above the method for processing a touch sensing signal.

The embodiments of the present invention may be implemented in the form of a computer program product which is implemented on one or more readable storage media (including, but not limited to, a disk memory, a CD-ROM, an optical memory) containing program code. A readable storage medium that can be used by a computer includes volatile and nonvolatile, removable and non-removable medium, and the information storage may be achieved by any method or technology. The information may be computer readable instructions, data structure, program modules or other data. Examples of machine readable storage medium includes, but is not limited to, a phase change memory (PRAM), a static random access memory (SRAM), a dynamic random access memory (DRAM), random access memories (RAM) of any other types, a read only memory (ROM), an electrically erasable and programmable read only memory (EEPROM), a flash memory or other memory technology, a compact disk read only memory (CD-ROM), a digital versatile disk (DVD) or other optical storage, magnetic cassette tape, magnetic tape storage or other magnetic storage device or any other non-transfer medium, which can be used to store information that can be accessed by a computer.

The above is only preferred embodiments, which are not intended to limit the present invention. Any modifications, substitutions, improvements that are made within the spirit and principles of the present invention should be covered within the scope of protection of the present invention.

The invention claimed is:

1. A system for processing a touch sensing signal, comprising a touch device and a host device, wherein the touch device comprises a touch sensor, the host device is equipped with an operating system, the operating system comprises signal processing module, a virtual touch device and an input subsystem, respectively;
the touch sensor, configured to generate a touch sensing signal, the touch device sends the touch sensing signal to the operating system;
the signal processing module, configured to convert the touch sensing signal received by the operating system to a touch signal and sends the touch signal to the virtual touch device, wherein the touch signal at least comprises a touch position signal;
the virtual touch device, configured to code the touch signal according to a data coding specification supported by the input subsystem, and sends the coded touch signal to the input subsystem;
the input subsystem, configured to generate a corresponding touch event in response to the coded touch signal.

2. The system according to claim 1, wherein the host device includes a processing chip, a storage, and a memory, and the signal processing module is formed by the processing chip reading computer program instructions stored in the storage into the memory for operation.

3. The system according to claim 1, wherein the touch sensor is also a device with functions of control, the touch device configured to send the touch sensing signal to the operating system in the following way:
transfer the touch sensing signal by the touch sensor to the operating system through the signal transfer interface of the touch device.

4. The system according to claim 1, wherein the touch device also includes a touch processing chip, the touch device configured to send the touch sensing signal to the operating system in the following way:
transfer the touch sensing signal by the touch processing chip to the operating system through the signal transfer interface of the touch device, wherein the touch sensing signal is read from the touch sensor by the touch processing chip.

5. The system according to claim 1, wherein the data coding specification is a standard data coding specification or a predetermined data coding specification.

6. The system according to claim 1, wherein the data coding specification is related to a type of a touch screen of the touch device.

7. The system according to claim 1, wherein the touch sensor comprises one or more of following:
an infrared touch frame, an electromagnetic panel, a capacitive touch panel, a resistive touch panel, or a pressure sensor.

8. The system according to claim 6, wherein when the touch sensor is the electromagnetic panel, the touch sensing signal comprises a variation of magnetic flux and a frequency of a received electromagnetic signal, and the touch signal comprises a touch position signal corresponding to the variation of magnetic flux and a pressure sensitive signal corresponding to the frequency.

9. The system according to claim 1, wherein the touch device sends the touch sensing signal to the operating system via any one of following interfaces:
a USB-bulk interface, a USB-hid interface, an RS232 interface.

10. The system according to claim 9, wherein the touch device converts the touch sensing signal to a protocol supported by the interface and then sends converted protocol data to the operating system via the interface.

11. The system according to claim 1, wherein if the touch signal comprises position coordinates of six or more pixel points, the virtual touch device codes the touch signal by group according to the data coding specification, and generates a data packet after coding each group of touch signal, each data packet comprising position coordinates of up to six pixel points.

12. The system according to claim 1, wherein the operating system further comprises a touch driver;
the signal processing module converts the touch sensing signal received by the operating system to the touch signal, and then sends the touch signal to the touch device;
the touch device codes the touch signal according to a standard data coding specification, and sends the coded touch signal to the operating system;
the touch driver analyzes the coded touch signal and transfers to the input subsystem;
the input subsystem recognizes the analyzed touch signal and generates a corresponding touch event.

13. A method for processing a touch sensing signal, applied to an operating system, the method comprising the steps of:
receiving a touch sensing signal generated by a touch sensor of a touch device;
converting the touch sensing signal to a touch signal by signal processing module, wherein the touch signal at least comprises a touch position signal;
coding the touch signal by a virtual touch device according to a data coding specification supported by an input subsystem, and transferring the coded touch signal to the input subsystem;
generating a corresponding touch event by the input subsystem in response to the coded touch signal.

14. The method according to claim 13, wherein the coding the touch signal according to a data coding specification supported by an input subsystem comprises:
if the touch signal comprises position coordinates of six or more pixel points, coding the touch signal by group according to the data coding specification, generating a data packet after coding each group of touch signal, each data packet comprising position coordinates of up to six pixel points.

15. The method according to claim 13, wherein the method further comprises:
   confirming that no virtual touch device is detected and sending the touch signal to the touch device so that the touch device codes the touch signal according to the data coding specification supported by the input subsystem;
   receiving the coded touch signal sent by the touch device, and transferring to a touch driver;
   analyzing the coded touch signal by the touch driver.

16. The method according to claim 13, wherein the operating system receives the touch sensing signal via any one of following interfaces:
   a USB-bulk interface, a USB-hid interface, an RS232 interface.

17. The method according to claim 13, wherein the receiving a touch sensing
   signal generated by a touch sensor of a touch device, further comprises:
   receiving a touch sensing signal generated by a touch sensor of a touch device by the touch sensor through a signal transfer interface of the touch device.

18. The method according to claim 13, wherein the receiving a touch sensing signal generated by a touch sensor of a touch device, further comprises:
   receiving a touch sensing signal generated by the touch processing chip through a signal transfer interface of the touch device, wherein the touch processing chip reads the touch sensing signal from the touch sensor.

19. An apparatus for processing a touch signal, applied to an operating system, and comprising:
   a signal receiving module, configured to receive a touch sensing signal generated by a touch sensor of a touch device;
   a signal converting module, configured to convert the touch sensing signal to a touch signal, wherein the touch signal at least comprises a touch position signal;
   a first transferring module, configured to, when a virtual touch device is detected, send the touch signal to the virtual touch device;
   the virtual touch device, configured to code the touch signal according to a data coding specification supported by an input subsystem, and send to the input subsystem;
   the input subsystem, configured to generate a corresponding touch event in response to the coded touch signal.

20. The apparatus according to claim 19, wherein the apparatus further comprises:
   a second transferring submodule, configured to, when no virtual touch device is detected, send the touch signal to the touch device;
   a touch signal returning module, configured to send the touch signal to the touch device so that the touch device codes the touch signal according to a standard data coding specification;
   a touch signal transferring module, configured to receive the touch signal coded by the touch device and send to a touch driver, so that the touch driver analyzes the received touch signal and sends to the input subsystem;
   wherein the input subsystem is further configured to recognize the analyzed touch signal and generate a corresponding touch event.

* * * * *